United States Patent
Jasjukevics

(10) Patent No.: US 12,187,460 B2
(45) Date of Patent: Jan. 7, 2025

(54) REUSABLE PART OF A SPACECRAFT AND REUSABLE KIT WITH NON-ABLATIVE HEAT SHIELDS

(71) Applicant: ArianeGroup GmbH, Taufkirchen (DE)

(72) Inventor: Arturs Jasjukevics, Bremen (DE)

(73) Assignee: ArianeGroup GmbH, Taufkirchen (DE)

( * ) Notice: Subject to any disclaimer, the term of this patent is extended or adjusted under 35 U.S.C. 154(b) by 223 days.

(21) Appl. No.: 17/523,545

(22) Filed: Nov. 10, 2021

(65) Prior Publication Data
US 2023/0145106 A1     May 11, 2023

(51) Int. Cl.
*B64G 1/14* (2006.01)
*B64G 1/58* (2006.01)
*B64G 1/62* (2006.01)

(52) U.S. Cl.
CPC ............... *B64G 1/14* (2013.01); *B64G 1/58* (2013.01); *B64G 1/62* (2013.01)

(58) Field of Classification Search
CPC .................................... B64G 1/58; B64G 1/62
See application file for complete search history.

(56) References Cited

U.S. PATENT DOCUMENTS

| | | | |
|---|---|---|---|
| 3,119,576 A * | 1/1964 | Nielsen | B64G 1/244 244/159.1 |
| 3,250,499 A | 5/1966 | Carroll | |
| 3,286,951 A | 11/1966 | Kendall | |
| 4,832,288 A | 5/1989 | Kendall et al. | |
| 5,927,653 A * | 7/1999 | Mueller | B64G 5/00 244/164 |
| 6,467,731 B1 * | 10/2002 | Harris | B64G 1/62 244/159.1 |
| 8,292,232 B1 * | 10/2012 | Andrews | B64G 1/62 244/159.1 |
| 11,565,833 B2 * | 1/2023 | Holemans | B64G 1/002 |

(Continued)

FOREIGN PATENT DOCUMENTS

| | | |
|---|---|---|
| CN | 104986358 B | 10/2015 |
| CN | 110116823 A | 8/2019 |
| JP | H04163300 A | 6/1992 |

OTHER PUBLICATIONS

Brogan, C., New record set for world's most hear resistant material, Imperial London College, Dec. 22, 2016, https://www.imperial.ac.uk/news/176628/new-record-worlds-most-heat-resistant/ (Year: 2016).*

(Continued)

*Primary Examiner* — Joshua J Michener
*Assistant Examiner* — Arfan Y. Sinaki
(74) *Attorney, Agent, or Firm* — Greer, Burns & Crain, Ltd.

(57) ABSTRACT

A part of a spacecraft, for instance an upper stage, is configured to re-enter into the atmosphere and to be reused for several missions. The part is equipped with a reusable kit comprising non-ablative heat shields, for example constructed with an outer surface formed of Ceramic Matrix Composites, such as Ultra High Temperature Ceramic Matrix Composites, and optionally at least one decelerator and/or at least one parachute and/or parafoil system.

20 Claims, 5 Drawing Sheets

(56) References Cited

U.S. PATENT DOCUMENTS

| | | | | |
|---|---|---|---|---|
| 2010/0320329 A1* | 12/2010 | Boelitz | ................... | B64G 1/62 |
| | | | | 244/158.9 |
| 2011/0297793 A1* | 12/2011 | Prampolini | ............ | B64G 1/002 |
| | | | | 244/158.9 |
| 2015/0344139 A1* | 12/2015 | Coleman | ................ | B63B 21/48 |
| | | | | 244/113 |
| 2016/0264266 A1 | 9/2016 | Stone | | |

OTHER PUBLICATIONS

Reusable Materials, Thermal Protection Materials Branch, National Aeronautics and Space Administration, May 20, 2019 https://www.nasa.gov/centers/ames/thermal-protection-materials/tps-materials-development/reusable.html (Year: 2019).*

Rueschhoff, L. M., Carney, C. M., Apostolov, Z. D., Cinibulk, M. K., Processing of fiber ultra-high temperature ceramic composites: A review, Ceramic Engineering & Science, Wiley, Oct. 18, 2019 https://ceramics.onlinelibrary.wiley.com/doi/full/10.1002/ces2.10033 (Year: 2019).*

European Search Report; European Patent Application No. 20207215 dated Mar. 5, 2021.

* cited by examiner

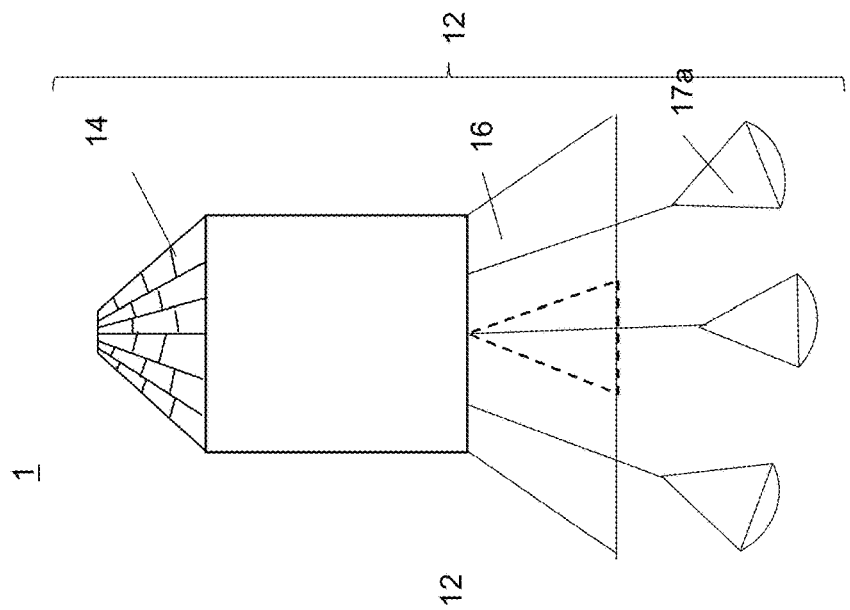
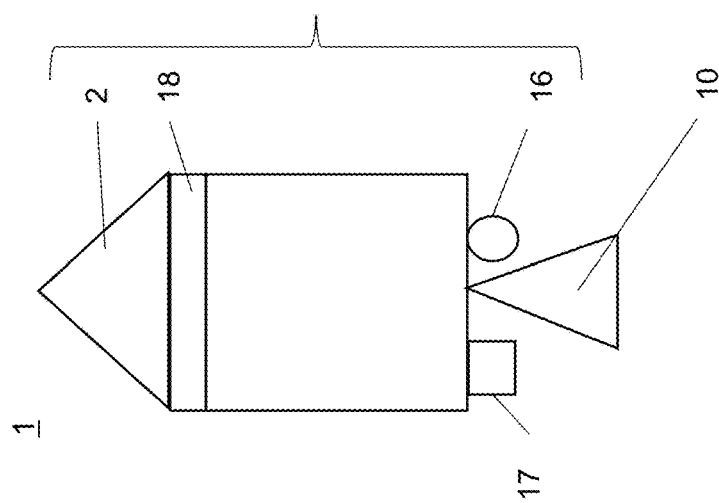
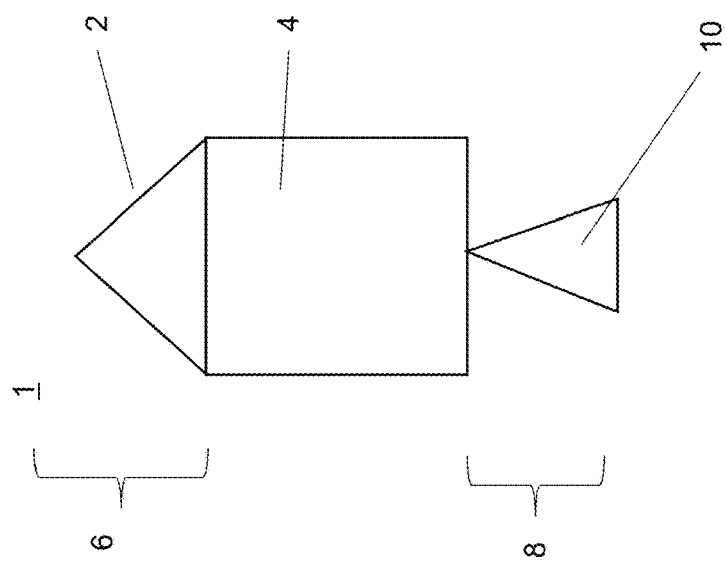

REUSABLE PART OF A SPACECRAFT AND REUSABLE KIT WITH NON-ABLATIVE HEAT SHIELDS

FIELD OF THE INVENTION

The present invention concerns a spacecraft part such as an upper stage of a spacecraft, a kit enabling the re-entry of a spacecraft part such as an upper stage of a spacecraft, a method for re-entry of a spacecraft part for reuse and a use of a material.

BACKGROUND OF THE INVENTION

In the past, upper stages of spacecraft burnt up on re-entry into the atmosphere. In the meantime, the need arises for reusing upper stages such as the spacecraft Space Shuttle several years ago. However, the Space Shuttle re-entered into the atmosphere in a non-ballistic way using aerodynamic lifting properties of the vehicle shape for a re-entry at non-zero angle of attack (angle between the vehicle's longitudinal axis and the relative flow direction of the atmosphere). In order to enable a ballistic re-entry without using aerodynamic lift of the vehicle at an angle of attack of zero or almost zero, the re-entry temperatures are much higher so that the heat shields have to withstand higher temperatures. Well known are ablative materials for spacecraft heat shields, however, such heat shields are not reusable as the material is being removed during the re-entry.

SUMMARY OF THE INVENTION

It is an object of the invention to provide a spacecraft part such that the upper stage can withstand the high temperatures at the re-entry into the atmosphere, to provide a reusable kit for enabling a spacecraft part such an upper stage to re-entry, to provide a method for re-entry of a spacecraft part such an upper stage for reuse, and to provide a use of Ceramic Matrix Composites (CMC).

According to the invention, a spacecraft part, for instance an upper stage, is configured to re-enter into the atmosphere and to be reused for several missions. The spacecraft part is equipped with reusable heat shields and at least one decelerator means. Preferably, the heat shields are of the non-ablative type and are made from Ceramic Matrix Composites (CMC), more preferably from Ultra High Temperature Ceramic Matrix Composites (UHTCM). The proposed solution allows the return of an upper (or other orbiting) rocket stage back to Earth safely and with a possibility of reuse. As an example, an Ariane 6 Upper Liquid Propulsion Module can be equipped with the reusable kit according to the invention. However, the invention could be applied on any other currently existing or in-development upper stage, either with reusable kit or as a part of baseline design. The possibility to extend the heat shield's diameter past the diameter of the spacecraft part such as an upper stage cylinder shadows the rest of the vehicle from the high-enthalpy flow and allows to design without dedicated thermal protection anywhere except on the nose heat shields. Additionally, the CMCs, in particular UHTCMCs, are an adequate material for control surfaces such as flaps and fins, which a priori experience greater heat fluxes than the rest of the vehicle. Here, higher thermal and geometrical stability during re-entry also provides more design freedom than common ceramic matrix composites or ablative materials.

In other words, the invention comprises a spacecraft part, such as an upper stage to be equipped with the reusable kit according to the invention. The reusable kit allows taking, for instance, a current Ariane 6, upper stage, and by adding extra hardware with minimum modifications to existing design, safely return such upper stage back to Earth with the final goal to reuse it. Further on, not only the upper stage can be re-used, but at least the heat shields of the kit themselves.

An inventive reusable Kit is to be installed on a spacecraft part provided to re-enter into the atmosphere, for instance an upper stage of a spacecraft, and comprises non-ablative heat shields to be configured to withstand temperatures over 2000° C., in particular, over 2500° C. Such temperatures normally arise in the phase of re-entry into the atmosphere. An exemplary material for the non-ablative heat shields is CMC, more preferably UHTCMC. Such material withstands the required temperatures and due to its non-ablative character, the kit can be reused for several missions without a replacement of the heat shields, respectively without any general replacement of the heat shields.

Preferably, in order to fit the heat shields and their support structure, the kit has a support structure carrying the heat shields and holding them in place at the spacecraft part.

In case a need for significant reduction of ballistic coefficient is identified, for instance for the deceleration from high supersonic to subsonic and controlled parafoil flight up to mid-air recovery, the kit can additionally or separately comprise at least one decelerator means.

The decelerator means is an inflatable aerodynamic decelerator or a deployable aerodynamic decelerator, for instance. The decelerator means is deployed already in vacuum before the re-entry interface. It helps decelerate the stage from high supersonic to low supersonic speeds.

In the case that the center of pressure is required to be shifted more aft, the kit can additionally or separately comprise adequate steering means and or control means, such as fins and/or flaps. Also, the decelerator can contribute to shifting the center of pressure aft. In order to withstand the high temperature, it is preferred if an outer surface of the steering means and or control means are made from CMC or UHTCMC.

In order to protect the decelerator means in its undeployed state against heat, for instance, if undeployed the decelerator means can surround the support structure carrying the heat shields and thereby be covered by the heat shields. In this state, the decelerator is rolled up as a cylindrical roll, whereas if the decelerator is unrolled, it forms a kind of umbrella surrounding the upper stage at least partially, for instance its cylindrical inner tank structure and/or its propulsion engine.

Preferably, the decelerator means is of such material and design that it protects the upper stage, at least partially, against heat in its deployed state. By means of this, the decelerator is a continuation of the heat shields.

According to the invention, a method of re-entry of a spacecraft part, such as an upper stage of a spacecraft, comprises the step of re-entry into the atmosphere in an angle of attack α=0 (zero) or almost zero. According to the invention, there is no need for additional hardware required for touchdown and terminal velocity reduction to zero (0), as it is performed by the helicopter, for instance. This reduces system complexity and costs.

An exemplary flight sequence is as followed:
Normal operation of the Launcher system, including the deployment of the payload(s)
Separation of the upper part of the upper stage, such as a launch vehicle adapter, and exposure of the heat shields
Retro boost to begin the re-entry
Change of orientation to nose-first Deployment of the decelerator
Re-entry and free fall
Optional: deployment of an inflatable aerodynamic decelerator and/or deployable aerodynamic decelerator and/or ballute
Flight through high-enthalpy phase
Deployment of parachutes sequence after reaching speeds below hypersonic (M<5)
Deployment of parafoil at subsonic
Capture with the helicopter
Return to manufacturing/integration site for refurbishment and eventual re-flight A preferred spacecraft part, such an upper stage, in order to realize this flight scenario is equipped with heat shields that have a thermal stability more than 2000° C., even more than 2500° C. An exemplary material is "conventional" CMC or UHTCMC which has a high thermal stability (>25000 C). The use of such material also allows the reusability of the heat shields. Such material is configured to manage the high enthalpy flow conditions and associated mechanical loads arising at the event of re-entry. In addition, it can be preferred if UHTCMC is used as an outer surface material for the spacecraft part. Besides heat shields, also steering and/or control surfaces can be made from UHTCMC.

The use of UHTCMC enables the concept of a ballistically re-entering heavy vehicle, for instance at re-entry for instance but not limited to BC>10 kg/m$^2$, from orbital velocity. The use of such material also allows the reusability of the heat shields. Additionally, extremely high thermal stability (>25000 C) giving more design freedom for the heat shield design. The material may support a preferred the ballistic re-entry into the atmosphere and does not require any essential new architecture of the upper stage.

Exemplary concepts, which are centered around the UHTCMC frontal heat shields are:
Inflatable aerodynamic decelerator/deployable aerodynamic decelerator on the front side behind the UHTCMC heat shields
Allows to further shadow the aft side of the vehicle
Such aerodynamic decelerator/deployable aerodynamic decelerator would have an incidence angle to the flow, smaller than that of the heat shields, in order to be able to manage the high heat flux, while still providing shadowing
It would also improve the static stability of the vehicle
It would reduce the ballistic coefficient of the re-entry vehicle overall
Aerodynamic decelerator/deployable aerodynamic decelerator ballute on the aft side
It would also improve the static stability of the vehicle
It would reduce the ballistic coefficient of the re-entry vehicle overall
Fins/flaps as control surfaces or fixed
To improve the static stability of the vehicle
To allow controllability in hypersonic and supersonic flight
Parachutes
To reduce the speed of the vehicle from supersonic to subsonic
Parafoil
To allow the vehicle to maneuver prior to mid-air capture by a helicopter The reusable kit comprises preferably of the following components:
Ultra-High Temperature Ceramic Matrix Composite frontal heat shield (and its support structure), which may have a diameter such that it extends past the diameter of the upper stage to shadow the vehicle behind the heat shields
Additional skirt under the Launch Vehicle Adaptor to allow accommodating the heat shields
Parachutes & Parafoil systems and their fixations on the aft side Additionally, following optional hardware is foreseen in the kit:
Fins/flaps on the aft side
Inflatable aerodynamic decelerator (IAD) and/or deployable aerodynamic decelerator either on the front side directly behind the rigid front heat shields, or on the aft side Again, main features of the invention are:
Reusable kit for an upper stage of a spacecraft, for instance the upper liquid propulsion module of Ariane 6
Re-use enables injection of micro satellite constellations into Low Earth Orbit, as an exemplary mission
Ballistic, un-guided re-entry ($\alpha$~00 angle of attack, no active control)
Mid-air retrieval (no landing legs, landing engines: empty upper stage is light enough)
Recovery back to manufacturing/integration site for refurbishment and reuse A preferred kit includes:
Additional skirt under the launch vehicle adapter
heat shields made from CMC or UHTCMC and support structure
Parachutes and parafoil systems and their fixations at the aft side.

Optionally the kit can conclude:
Fins/flaps, and/or
Inflatable aerodynamic decelerator or deployable aerodynamic decelerator It is noted that the reusable kit can be adapted to other spacecraft parts in order to enable their re-entry. The use of the kit is not limited to an upper stage.

In the following, preferred embodiments of the present invention are explained with respect to the accompanying drawings. As is to be understood, the various elements and components are depicted as examples only, may be facultative and/or combined in a manner different than that depicted. Reference signs for related elements are used comprehensively and are not defined again for each figure. Shown is schematically in FIG. 1 shows an upper stage, for instance an upper liquid propulsion module of Ariane 6 carrying a launch vehicle adapter, FIG. 2 shows a first embodiment of a reusable upper stage equipped with a reusable kit showing an undeployed and/or uninflated decelerator at the aft side, FIG. 3 shows the first embodiment of an upper stage showing heat shields of the kit after separation of the launch vehicle adapter and the deployed and/or inflated decelerator, FIG. 4 shows a second embodiment of an upper stage equipped with a reusable kit showing its deployed and/or inflated decelerator at the front side, FIG. 5 shows a third embodiment of an upper stage equipped with a reusable kit showing a deployed and/or inflated decelerator at the front side, FIG. 6 shows a fourth embodiment of an upper stage equipped with a reusable kit having an extending heat shields panel at the front side, FIG. 7 shows a cross-sectional view of a preferred upper stage at its front side, FIG. 8 shows a preferred mission profile, FIG. 9 a preferred re-entry of the upper stage in free fall, and FIG. 10 shows an illustration of the angle of attack.

BRIEF DESCRIPTION OF THE DRAWINGS

In FIG. 1, a common spacecraft part, such as an upper stage 1, in particular an upper liquid propulsion module of Ariane 6, carrying a launch vehicle adapter 2, is shown.

Figure 6:
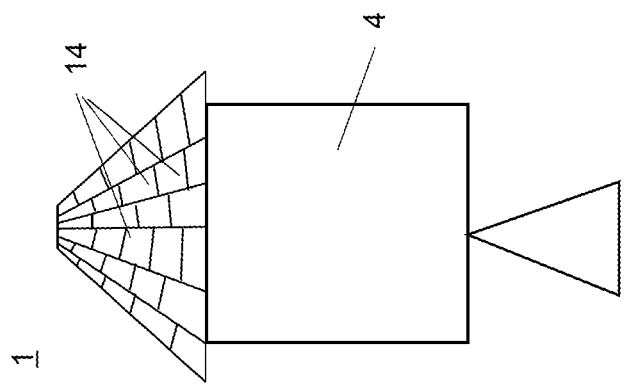

The upper stage 1 has a cylindrical part, in particular, a cylindrical inter tank structure 4, a conical front side 6 and an aft side 8. At its front side 6, the launch vehicle adapter 2 is positioned having the same conical shape as the front side 6. In particular, in the embodiment as illustrated in FIGS. 1, 2 and 3, the front side 6 has a maximum outer diameter that is similar or equal, respectively, as the outer diameter of the cylindrical inter tank structure 4 such that the front side 6 does not project over the cylindrical inter tank structure laterally. At the aft side 8, a central propulsion engine 10 is arranged which is used as a driving means. Additionally, fins or flaps as control surfaces 23 may be provided on the aft side 6 (see FIG. 4).

As shown in FIGS. 2 and 3, the upper stage 1 can be equipped with a reusable kit 12 enabling the upper stage to re-entry into the atmosphere and to be reused for several missions according to the invention. In FIG. 2, the upper stage 1 is shown in a mission phase before separation of the launch vehicle adapter 2, whereas in FIG. 3, the upper stage 1 is shown in a mission phase after the separation of the launch vehicle adapter 2, ready for re-entry into the atmosphere.

The kit 12 comprises heat shields 14 and, as shown in this embodiment, at least one decelerator 16 and optionally a parachute and/or parafoil system 17.

The heat shields 14 protect the upper stage 1 against the high temperature which arise during the re-entry. The heat shields 14 are positioned under the launch vehicle adapter 2 which is held in place by a skirt 18 surrounding the cylindrical part 4 adjacent to the front side 6 of the upper stage 1. When the launch vehicle adapter 2 is separated, its skirt 18 is detached and the heat shields 14 are exposed. In addition, the deployment of the decelerator 16 is allowed. As will be explained in more detailed with reference to FIG. 7, the heat shields 14 are supported by a support structure 19 which is attached to the upper stage cylinder 4 under the skirt 18.

A preferred material for the heat shields 14 is Ceramic Matrix Composites (CMC), for instance High Temperature Ceramic Matrix Composites (HTCMC). In order to enable the reusability of the kit 12, the heat shields 14 are non-ablative. In the phase before re-entering into the atmosphere, the heat shields 14 are positioned on their support structure 19 (FIG. 7) between an outer surface of the front side 6 and the launch vehicle adapter 2. In this position, they are completely covered by the launch vehicle adapter 2. The heat shields 14 form a kind of a conical panel extending nearly over the whole outer surface of the front side 6. In this embodiment, the diameter of the heat shield panel is a bit smaller than the diameter of the cylindrical part 4 in order to allow an integration of the cylindrical part 4 that shifts the launch vehicle adapter 2 higher. The coverage of the outer diameter of the upper stage 1 and its sides is achieved with the decelerator 16. If the launch vehicle adapter 2 is separated, the heat shields 14, respectively the heat shields panel, cover the front side 6 on its outer surface.

The at least one decelerator 16 or the decelerator system, respectively, is in its undeployed state in such a position at the aft side 8 that it protects against the high temperatures during the re-entry phase. The decelerator 16 is an inflatable aerodynamic decelerator and/or deployable aerodynamic decelerator.

The basic function of the decelerator 16 is to reduce the ballistic coefficient, if necessary, or and/or to decelerate the upper stage 1 from high supersonic to subsonic. It would be deployed prior to reaching the re-entry interface so it would go through the high-enthalpy flow phases.

In the embodiment shown in FIG. 2, the decelerator 16 is positioned at the aft side 8 within the outer diameter of the cylindrical inter tank structure 4. The decelerator means 16 is preferably already deployed in vacuum before the re-entry interface, helping to decelerate the stage from high supersonic to low supersonic speeds.

Figure 9:
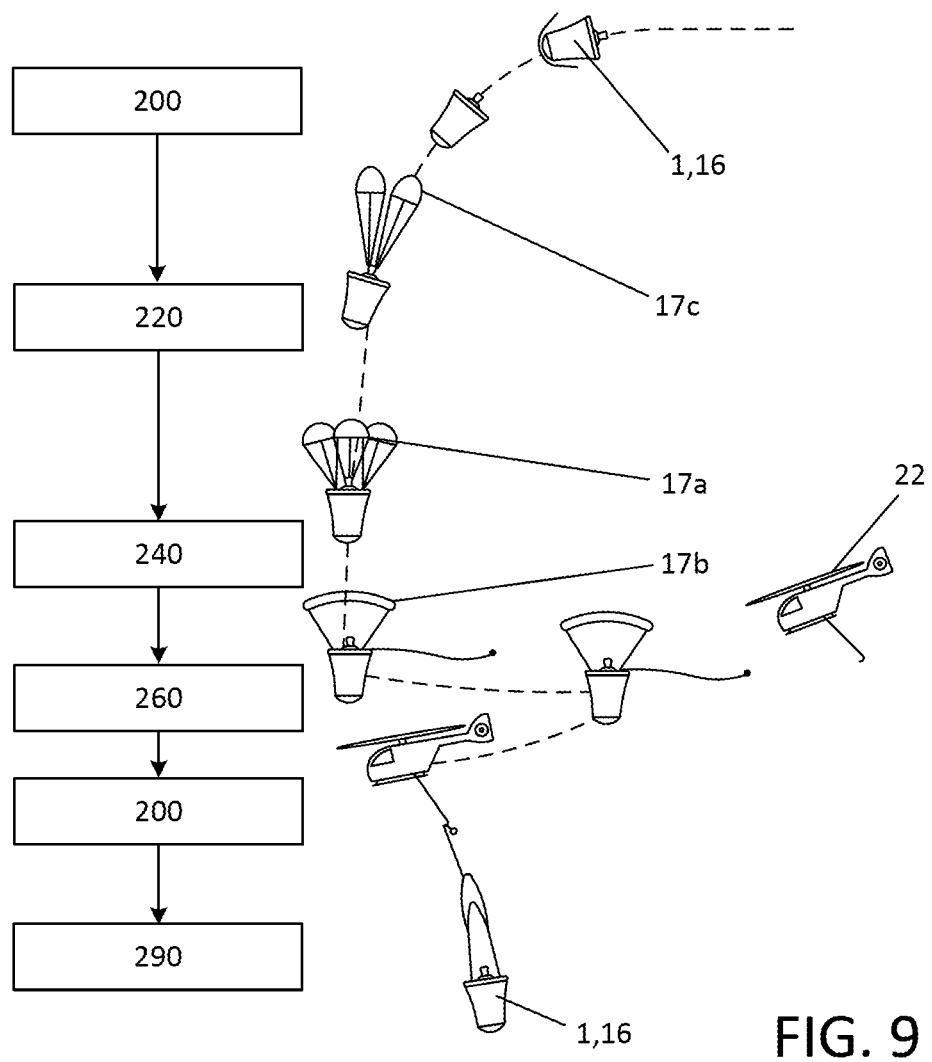

The parachute and/or parafoil system 17 is also positioned at the aft side 8 of the upper stage 1. Exemplarily, three parachutes 17a of the parachute and/or parafoil system 17 are shown. It can finally be deployed to slow the upper stage 1 down further. Further details of the parachute and/or parafoil system 17 are illustrated in FIG. 9. As can be seen in FIG. 9, a combination of both parachutes 17a and parafoils 17b is possible. Even ballutes 17c can be incorporated in the parachute and/or parafoil system 17.

Figure 5:
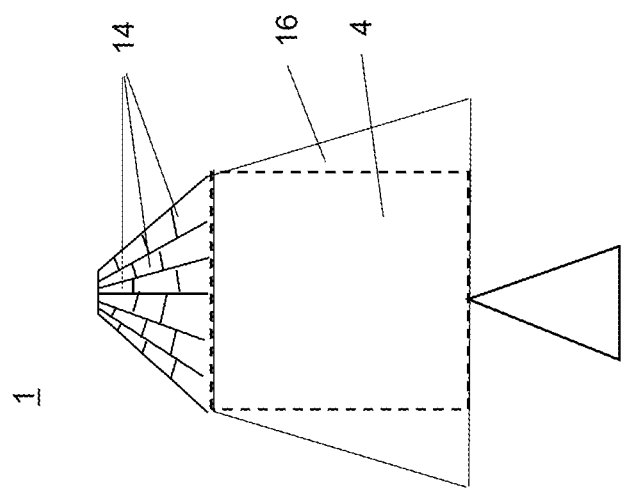
Figure 4:
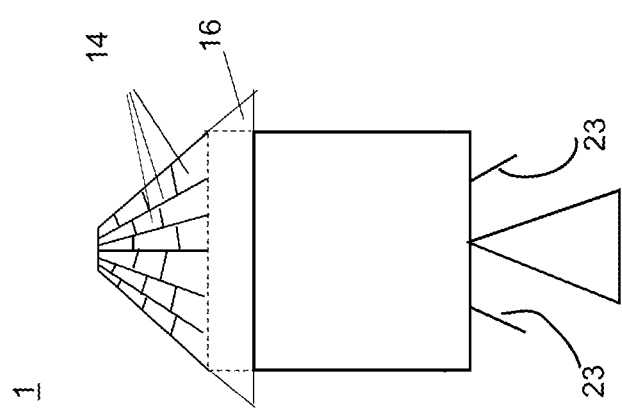

In FIGS. 4 and 5, further embodiments of a spacecraft part, such as an upper stage 1, is shown. The main difference between the embodiments according to FIGS. 2 and 3, and the embodiment of FIGS. 4 and 5, is that in FIGS. 4 and 5 the at least one decelerator 16 is positioned at the front side 6 of the upper stage 1. In FIG. 4, the at least one decelerator 16 is configured to extend the conical shape of the front side 6 in its deployed state thereby surrounding the cylindrical inter tank structure 4 at least partially behind the front side 6. In FIG. 5, the deployed decelerator 16 extends at least over the entire axial length of the cylindrical inter tank structure 4 reaching to the aft side 8 or even beyond. In both embodiments according to FIGS. 4 and 5, its undeployed and/or uninflated state, the at least one decelerator 16 is in such position that it protected against the high temperatures during the re-entry phase.

In FIG. 6, a further embodiment of a spacecraft part, such as an upper stage 1, is shown. Contrary to embodiments shown before, a conical shaped front side 6 extends laterally over the cylindrical inter tank structure 4 of the upper stage 1. The upper stage 1 is also equipped with a reusable kit 12 according to the invention. For the sake of clarity, the reusable kit 12 is not illustrated. A not shown decelerator means 16, such as an inflatable aerodynamic decelerator and/or deployable aerodynamic decelerator, can be positioned at the front side 6 and/or at the aft side 8 as explained in the figures before.

In order to effectively shadow the cylindrical inter tank structure 4 within an oscillation range when the decelerator 16 is positioned at the aft side 8, the diameter of a heat shields panel is increased in correspondence to the conical shaped front side 6. As the front side 6 extends laterally over the cylindrical inter tank structure 4, shadowing is provided against high-enthalpy flow.

Figure 7:
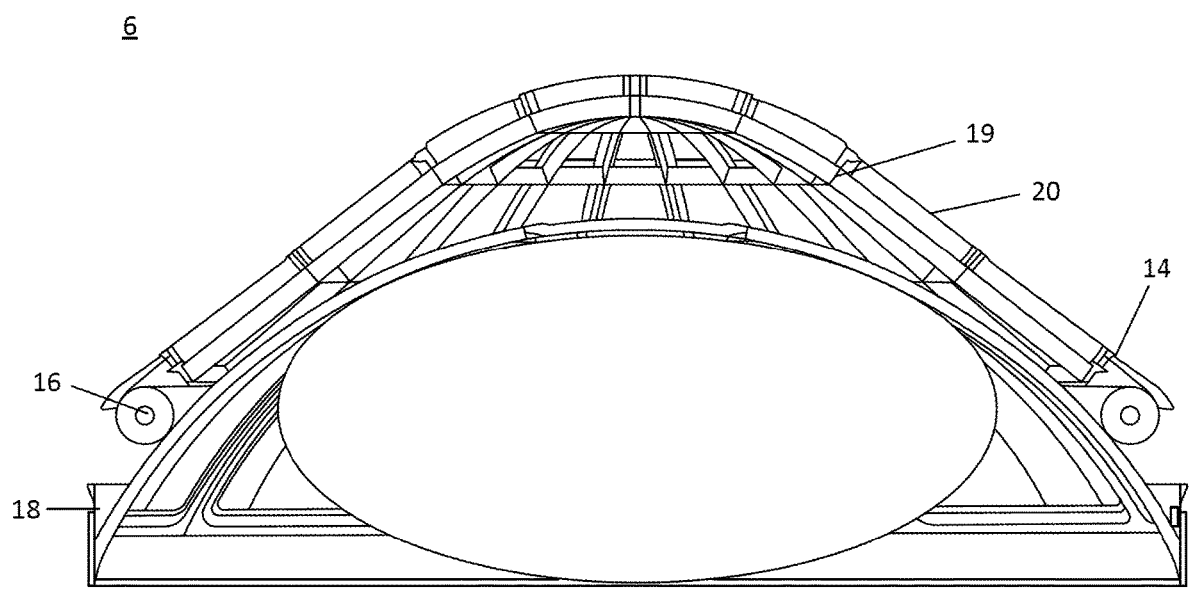

FIG. 7 illustrates how the heat shields 14 are supported on the front side 6 and where the decelerator means 16 is positioned in its undeployed state.

The heat shields 14 are arranged to form a heat shield panel covering the outer surface of the front side 6. They are carried by a support structure 19, corresponding to the conical shape of the front side 6. In addition, isolation elements 20 can be positioned under the heat shield panel, in particular between the heat shields 14 and the support structure 19. In order to create space for the undeployed decelerator 16, the heat shields 14 extends laterally over the support structure 19.

In its undeployed state, the decelerator means 16 surrounds the support structure 19 and is positioned in the space between the heat shields 14 and the outer surface of the front end 6. The decelerator 16 is rolled up and when it is deployed it is getting unrolled continuing the conical shape of the heat shield panels (FIGS. 4 and 6).

For the sake of completeness, the detachable skirt 18 holding the launch vehicle adapter 2 is illustrated.

Figure 8:
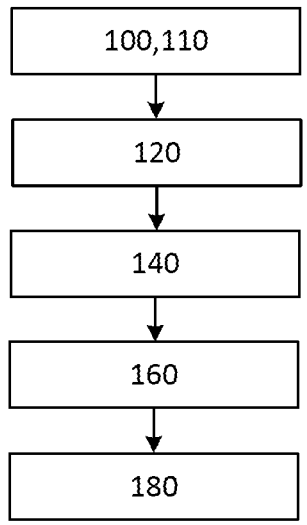

In FIGS. 8 and 9, an ascent, flight, re-entry and recovery profile are described. On a mission profile level, the following sequence can be foreseen:

FIG. 8:
Normal operation 100 of the Launcher system, including the deployment 110 of the payload(s)
Separation 120 of the upper part of the upper stage 1 such as the launch vehicle adapter 2 and exposure of the heat shields 14
Retro boost 140 to begin the re-entry
Change of orientation to nose-first (front side 6) 160
Deployment 180 of the decelerator 16
FIG. 9:
Re-entry and free fall 200
Optional: deployment of ballute 220
Flight through high-enthalpy phase
Deployment of parachutes system 240 after reaching speeds below hypersonic (M<5)
Deployment of parafoil at subsonic 260
Capture 280 with the helicopter 22
Return 290 to site for refurbishment and re-flight In other words, after launch from a ground station such as Kourou and the separation of the reusable upper stage 1 and deployment of satellites, the upper stage 1 performs a deorbitation burn and reorients itself to align the heat shields 14 in the direction of the velocity vector. An inflatable aerodynamic decelerator 16 is then deployed at the preferred altitude of around 120 km prior to the point when aerodynamic forces dominate the capabilities of a reaction control system of the upper stage 1. Then the hypersonic, high enthalpy flow portion of the flight takes place, followed by deployment of a series of parachutes 17a. Eventually a parafoil 17b is deployed, and the upper stage begins its controlled flight towards the rendezvous point with the recovery aircraft, which then brings it back to the ground station.

Figure 10:
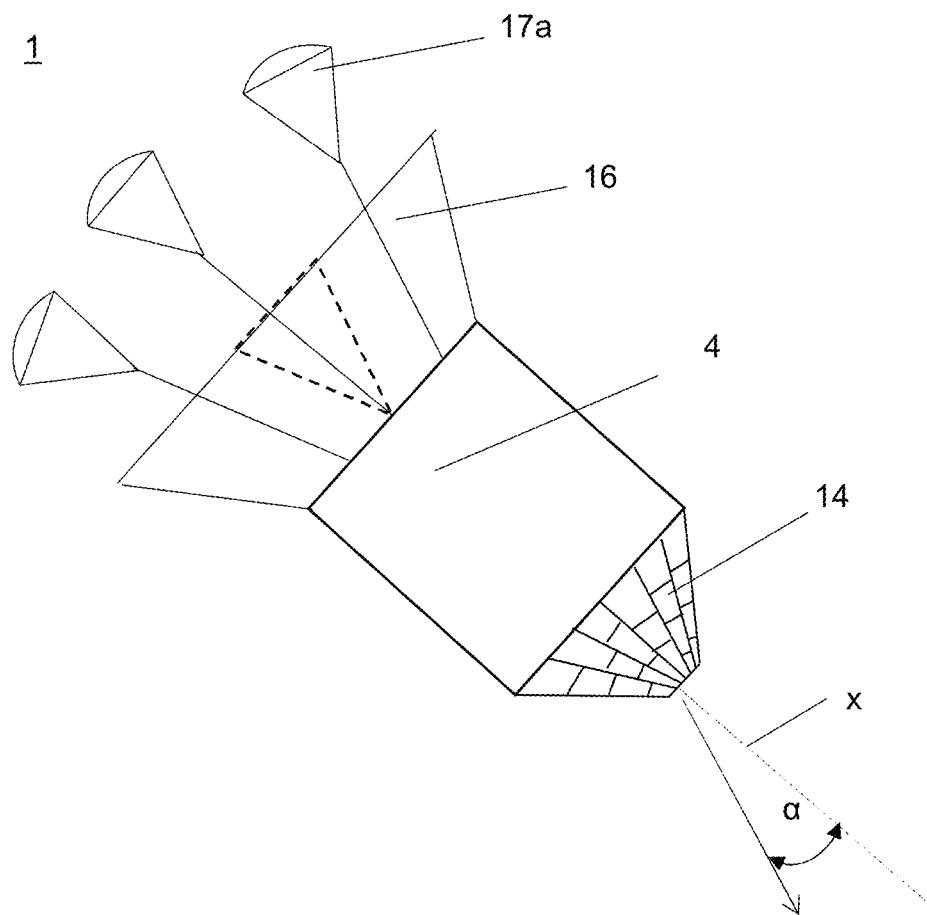

In FIG. 10, an attack angle α of zero is illustrated resulting in a ballistic entry. The angle of attack α is defined between the longitudinal axis of the upper stage 1 and relative flow direction of the atmosphere. In addition, the deployed decelerator means 16 and deployed parachutes 17a are shown in both states, undeployed and/or uninflated and deployed and/or inflated (dotted lines).

Disclosed is a part 1 of a spacecraft, for instance an upper stage, configured to re-entry into the atmosphere and to be reused for several missions, wherein the part 1 is equipped with a reusable kit comprising non-ablative heat shields 14, at least one decelerator means 16, and/or at least one parachute and/or parafoil system 17, a reusable kit 12 and a method to re-entry into the atmosphere.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 1 spacecraft part, here: upper stage
2 launch vehicle adapter, here: upper part
4 cylindrical part, here: inter tank structure
6 front side
8 aft side
10 engine
12 kit
14 heat shield
16 decelerator means, in particular inflatable aerodynamic decelerator and/or deployable aerodynamic decelerator
17 parachute and/or parafoil system
17a parachute
17b parafoil
17c ballute
18 skirt
19 support structure
20 isolation elements
22 helicopter
100 normal operation of a launcher system
110 deployment of the payload
120 separation of upper part
140 retro-boost
160 change of orientation
180 deployment of decelerator
200 re-entry
120 deployment of ballute
240 deployment of parachute system
260 deployment of parafoil system
280 capture
290 return to side
X longitudinal axis of the upper stage
α angle of attack

The invention claimed is:

1. A part of a spacecraft configured to re-entry into an atmosphere and to be used for two or more missions, wherein the part is equipped with reusable heat shields positioned at a front side of the part under a separable launch vehicle adapter, and at least one decelerator.

2. The part of the spacecraft according to claim 1, wherein said part comprises an upper stage.

3. The part of the spacecraft according to claim 1, wherein an outer surface material of said reusable heat shields comprises Ceramic Matrix Composites.

4. The part of the spacecraft according to claim 3, wherein the Ceramic Matrix Composites comprises Ultra High Temperature Ceramic Matrix Composites.

5. A kit configured to be installed on a part of a spacecraft provided to re-enter into an atmosphere, comprising non-ablative heat shields positioned at a front side of the part under a separable launch vehicle adapter.

6. The kit according to claim 5, wherein the kit is configured to be installed on an upper stage of the spacecraft.

7. The kit according to claim 5, wherein the non-ablative heat shields are configured to withstand temperatures over 2000° C. or over 2500° C.

8. The kit according to claim 5, comprising a support structure configured to hold the heat shields in place at the part of the spacecraft.

9. The kit according to claim 5, further comprising at least one decelerator means.

10. The kit according to claim 9, wherein the decelerator means is an inflatable aerodynamic decelerator.

11. The kit according to claim 9, wherein the decelerator means is a deployable aerodynamic decelerator.

12. The kit according to claim 9, wherein the decelerator means is configured to protect, in a deployed state, the part of the spacecraft at least partially against heat.

13. The kit according to claim 9, further comprising a support structure carrying the heat shields,
    wherein the decelerator means is shaped to surround, in an undeployed state, the support structure, whereby the decelerator means is covered by the heat shields.

14. The kit according to claim 5, further comprising control surfaces.

15. The kit according to claim 5, wherein an outer surface material of said reusable heat shields comprises Ceramic Matrix Composites.

16. The kit according to claim 15, wherein the Ceramic Matrix Composites comprises Ultra High Temperature Ceramic Matrix Composites.

17. A method of re-entry of a spacecraft part, comprising:
    equipping the spacecraft part with reusable non-ablative heat shields at a front side of the spacecraft part under a separable launch vehicle adapter, and
    reentering the spacecraft part into an atmosphere at an angle of attack of substantially zero.

18. The method according to claim 17, wherein said spacecraft part comprises an upper stage of a spacecraft.

19. The method according to claim 17, wherein said spacecraft part is equipped with a decelerator.

20. The method according to claim 17, wherein the heat shields are configured to withstand temperatures over 2000° C.

* * * * *